3,332,768
METHOD OF SELECTIVELY DESTROYING WEEDS
Heinz E. Freund, Friedrich Arndt, and Reinhart Rusch,
  Berlin, Germany, assignors to A. G. Schering, Berlin,
  Germany
No Drawing. Filed Oct. 20, 1964, Ser. No. 405,275
Claims priority, application Germany, Dec. 6, 1963,
              Sch 34,279
            4 Claims. (Cl. 71—118)

This invention relates to the destruction of weeds, and particularly to aniline derivatives which selectively destroy weeds in crops without affecting the crops.

We have found that compounds of the formula

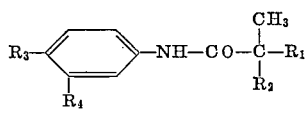

in which $R_1$ is lower alkyl, $R_2$ is halogen, and $R_3$ and $R_4$ each are hydrogen, halogen, lower alkyl, lower alkoxy, trifluormethyl, or the nitro group are selective herbicides which destroy certain weeds otherwise difficult to eradicate, while being without significant effect on the crops in which such weeds occur.

The best results are achieved with those compounds of the invention in which $R_1$ is a lower alkyl radical having a straight chain, and more specifically n-propyl, when $R_2$ is either chlorine or bromine, and $R_3$ is chlorine or methyl, and $R_4$ is chlorine.

The herbicidal compounds of the invention are well tolerated by wheat and corn in concentrations well above those required for destroying weeds which heretofore were difficult to kill in wheat and corn crops, such as members of the genus Polygonum.

Polygonum is fully resistant to growth promoting herbicides commonly employed in wheat crops, such as 2,4-dichlorophenoxyacetic acid (2,4-D), α-(2-methyl-4-chlorophenoxy)-propionic acid (CMPP), and 2-methyl-4-chlorophenoxyacetic acid (MCPA). Polygonum can be attacked successfully with contact herbicides such as dinitro-o-cresol, or with mixtures of MCPA and 2,3,6-trichlorobenzoic acid (TBA), and with α-(2,4-dichlorophenoxy)-propionic acid (2,4-DP). The contact herbicides, however, are toxic to humans and tend to color the human skin. Their use thus is hazardous and inconvenient. Mixtures of MCPA and TBA have a very narrow margin of tolerance and may interfere with the proper growth of wheat and reduce crop yields. 2,4-DP can be applied only during a very short period after the five-leaf stage of the wheat. The compounds of the invention avoid the limitations and hazards inherent in the herbicides presently in commercial use.

Some anilides of carboxylic acids are known to possess herbicidal properties, and some known anilides are less toxic to wheat and corn than to the weeds that it is desired to destroy. The margin of safety available in the known herbicidal anilide derivatives, however, is so narrow that they have not achieved commercial success. The compounds of the invention are characterized by the great differences between the application rates adequate for destruction of the weeds and the minimum application rates that will produce measurable crop damage. Typically, 1 kilogram or less of the compounds of the invention when applied to one hectare of crop land destroys weed, whereas 10 kg./ha. (kilograms per hectare) damage neither wheat nor corn. Even 0.3 kg./ha. α-bromo-α-methylvaleryl-3,4-dichloroaniline destroys *Polygonum lapathifolium*, and other weeds are similarly sensitive to the herbicides of the invention.

The aniline derivatives of the invention are prepared by known methods, and the following reaction is generally applicable:

0.1 mol of an aniline derivative of the formula

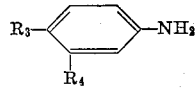

and 0.1 mol of an acid acceptor, such as triethylamine, are dissolved or dispersed in 150 milliliters of a suitable solvent, for example, acetonitrile, and 0.1 mol of a halide of a carboxylic acid having the formula

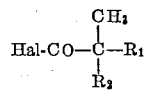

is added with agitation drop by drop at such a rate that the reaction temperature does not rise above 50° C. Stirring is continued for one to two hours, and the reaction mixture is then poured into a mixture of ice and water with stirring.

If the anilide formed is solid at ordinary temperature, it may be removed from the aqueous mixture by filtration, washed, dried, and recrystallized from suitable solvents, such as petroleum hydrocarbons or benzene. Compounds which are oily liquids at room temperature may be extracted from the aqueous mixture with ether. The extract is dried with desiccated sodium sulfate, the ether is evaporated, and the residue is purified by conventional methods, for example, by chromatography of its benzene solution on silica gel. The yields are between 50 and 90 percent.

The following examples illustrate the application of the basically known method of synthesis briefly outlined above to typical compounds of the invention.

Example 1

One mole (162 g.) 3,4-dichloroaniline was dissolved in 600 ml. toluene, and one mol (40 g.) sodium hydroxide was dissolved in 500 ml. water. The two solutions were combined and vigorously agitated while one mol (169 g.) α-chloro-α-methylvaleryl chloride was added drop by drop at such a rate that the temperature of the mixture was maintained at 40–45° C. Addition of the chloride was completed within 30 minutes, and stirring was continued for two hours while the temperature dropped to room temperature.

The toluene was evaporated in a vacuum at 30–40° C., whereby a solid precipitate was formed. The solid material was recovered by filtration with suction, washed with water, and dried in a vacuum at ambient temperature. The yield was 290 g. (98.5%), the melting point 54.5–56.5° C. The elemental analysis was in good agreement with the expected values for N-α-chloro-α-methylvaleryl-3,4-dichloroaniline:

Calculated: 48.9% C; 4.8% H; 36.1% Cl; 4.8% N.
Found: 48.6% C; 4.8% H; 35.3% Cl; 4.6% N.

When recrystallized from pentane, the compound had a melting point of 57–58° C.

Example 2

0.5 mol (81 g.) 3,4-dichloroaniline and 0.5 mol (51 g.) triethylamine were dissolved in 500 ml. acetonitrile. While the solution was being stirred vigorously and cooled externally, 0.5 (=129 g.) mol α-bromo-α-methylvaleryl bromide was added drop by drop over a period of 30 minutes. The reaction temperature did not rise above 20° C. Stirring was continued for two hours, and the reaction mixture was then poured into five liters of a mixture of ice and water. A precipitate was formed and was separated from the liquid phase by filtering with suction. The solid product was washed with water, dried, and recrystallized from light petroleum (B.P. 80°–120° C.).

The purified material weighed 108 g. (63.7% yield), had a melting point of 67.5–68.5° C., and its elementary analysis agreed with that calculated for N-α-bromo-α-methylvaleryl-3,4-dichloroaniline:

Calculated: 42.5% C; 4.2% H; 4.1% N. Found: 42.2% C; 4.0% H; 4.4% N.

*Example 3*

0.5 mol each of p-bromoaniline (86 g.) and triethylamine (51 g.) were dissolved in 700 ml. acetonitrile, and 0.5 mol (71 g.) α-chloroisobutyryl chloride were added drop by drop with stirring. The temperature of the mixture was thereby gradually increased to 50° C. Stirring was continued for one hour without external heating or cooling after all reactants had been mixed, and the reaction mixture was poured over five liters of water and ice. The precipitate formed was worked up as described in Example 2.

The product weighed 110 g. (79.5% yield) and had a melting point of 97.5–98° C. The elementary analysis agreed with that of N-α-chloroisobutyryl-4-bromoaniline.

Calculated: 43.4% C; 4.0% H; 28.9% Br. Found: 43.7% C; 4.2% H; 28.8% Br.

Representative selective herbicidal agents of the invention that have been prepared by methods analogous to those described in Examples 1 to 3 are listed in Tables 1 to 5 with their melting points, where available, and with an identifying number for reference hereinafter. The compounds of the several tables differ from each other by substituents in the carboxyl moiety, those listed in the same table by substituents in positions 3 and 4 of the aniline moiety.

TABLE 1.—N-α-CHLOROISOBUTYRYL-3-X-4-Y-ANILINE

| Compound No. | X | Y | Melting Point, °C. |
|---|---|---|---|
| 1 | H | H | 68.5–69 |
| 2 | H | F | 78–79 |
| 3 | Cl | H | 80.5–81 |
| 4 | H | Cl | 96–96.5 |
| 5 | H | Br | 97.5–98 |
| 6 | Cl | Cl | 118.5–119 |
| 7 | CH₃ | H | 76–77 |
| 8 | H | CH₃ | 65–66 |
| 9 | CH₃ | CH₃ | 89–90 |
| 10 | Cl | CH₃ | 120–121 |
| 11 | H | OCH₃ | 67–68 |
| 12 | H | OC₂H₅ | 68–69 |
| 13 | NO₂ | H | 67–67.5 |
| 14 | H | NO₂ | 112–112.5 |
| 15 | CF₃ | H | 86–86.5 |

TABLE 2.—N-α-BROMOISOBUTYRYL-3-X-4-Y-ANILINE

| Compound No. | X | Y | Melting Point, °C. |
|---|---|---|---|
| 16 | H | H | 80–81 |
| 17 | H | F | 89–90 |
| 18 | Cl | H | 88.5–89 |
| 19 | H | Cl | 110–111 |
| 20 | H | Br | 119–120 |
| 21 | Cl | Cl | 107–108 |
| 22 | CH₃ | H | 93–94 |
| 23 | H | CH₃ | 88–89 |
| 24 | CH₃ | CH₃ | 106–107 |
| 25 | Cl | CH₃ | 123–124 |
| 26 | H | OCH₃ | 86.5–87.5 |
| 27 | H | OC₂H₅ | 73–74 |
| 28 | NO₂ | H | 94–95 |
| 29 | H | NO₂ | 117–118 |
| 30 | CF₃ | H | 72–73 |

TABLE 3.—N-α-BROMO-α-METHYLBUTYRYL-3-X-4-Y-ANILINE

| Compound No. | X | Y | Melting Point °C. |
|---|---|---|---|
| 31 | H | H | 37–38 |
| 32 | H | F | 42–43 |
| 33 | Cl | H | 70–71 |
| 34 | H | Cl | 53–54 |
| 35 | H | Br | 62–63 |
| 36 | Cl | Cl | 57–58 |
| 37 | CH₃ | H | 67–68 |
| 38 | H | CH₃ | 53–53.5 |
| 39 | CH₃ | CH₃ | 73–74 |
| 40 | Cl | CH₃ | 72–73 |
| 41 | H | OCH₃ | 40–41 |
| 42 | H | OC₂H₅ | 55–56 |
| 43 | H | NO₂ | 68–69 |

TABLE 4.—N-α-CHLORO-α-METHYLVALERYL-3-X-4-Y-ANILINE

| Compound No. | X | Y | Melting Point, °C. |
|---|---|---|---|
| 44 | H | Cl | 70–71 |
| 45 | H | Br | 71–72 |
| 46 | Cl | Cl | 57–58 |
| 47 | Cl | CH₃ | 56–56.5 |
| 48 | H | OCH₃ | 34.5–35.5 |

TABLE 5.—N-α-BROMO-α-METHYLVALERYL-3-X-4-Y-ANILINE

| Compound No. | X | Y | Melting Point, °C. |
|---|---|---|---|
| 49 | H | H | (¹) |
| 50 | Cl | H | (²) |
| 51 | H | Cl | 67.5–68.5 |
| 52 | H | Br | 88–89 |
| 53 | Cl | Cl | 67.5–68.5 |
| 54 | CH₃ | H | (³) |
| 55 | H | CH₃ | 42–43 |
| 56 | CH₃ | CH₃ | 81–82 |
| 57 | Cl | CH₃ | 64–65 |
| 58 | H | OCH₃ | 61–62 |
| 59 | H | OC₂H₅ | 52–53 |
| 60 | NO₂ | H | 62–63 |
| 61 | H | NO₂ | 95–96 |
| 62 | CF₃ | H | (⁴) |

¹ Oily, not distillable. Calculated: 29.6% Br; 5.2% N. Found: 29.7% Br; 5.1% N.
² Oily, not distillable. Calculated: 47.3% C; 5.0% H; 4.6% N. Found: 47.9% C; 5.1% H; 4.5% N.
³ Oily, not distillable. Calculated: 54.9% C; 6.4% H; 28.1% Br; 4.9% N. Found: 55.3% C; 6.4% H; 27.9% Br; 5.0% N.
⁴ Oily, not distillable. Calculated: 16.8% F; 4.1% N. Found: 16.4% F; 4.6% N.

The anilides of the invention may be incorporated in herbicidal compositions either singly, in combination with each other, in combination with other herbicides, and in combination with active agents of a different type, for example, with fertilizers.

Herbicidal compositions containing the aniline derivatives of the invention as active agents are employed in a conventional manner and are formulated according to the desired method of application. The compositions may be powders or dusts, granulates, solutions, or emulsions. The compounds of the invention are combined in such compositions with liquid or solid inert carriers. Small amounts of surfactants may be added as is usual. Suitable liquid carriers include water, mineral oil and other organic solvents such as xylene, cyclohexanol, cyclohexanone, isophoron, chloroform, carbon tetrachloride, dimethylformamide, dimethylsulfoxide, and the like. Conventional solid carriers that may be employed in spreading the herbicidal compounds of the invention include limestone, kaolin, chalk, talcum, attaclay and other grades of clay. Soluble salts of lignosulfonic acid, and of alkylated benzenesulfonic acids, sulfonated acid amides and their salts, polyethoxylated amines and alcohols have been found to be satisfactory surfactants for the purposes of this invention.

The following examples are indicative of the manner in which herbicidal compositions may be prepared from the several compounds listed in the tables, and it will be understood that the invention is not limited to specific ingredients of the herbicidal compositions.

Example 4

20 parts by weight of compound No. 46 were mixed by stirring with 70 parts xylene and 10 parts of a commercial emulsifying composition containing as active ingredients calcium dodecylbenzenesulfonate and ethoxylated oleyl alcohol.

The homogeneous mixture obtained when added to water yielded herbicidal emulsions.

Example 5

20 parts by weight of compound No. 46 were mixed with 70 parts kaoline, 8 parts calcium lignosulfonate, and two parts of a commercial wetting agent based on sodium β-(oleyl-methylamino)-ethanesulfonate. The mixture was finely ground in a pin mill until it had the consistency of a wettable powder.

The powder readily dispersed in water upon contact, and the dispersions were employed for spraying weed infested crops.

The optimum rate of application of the herbicidal compounds of the invention may vary greatly. It is influenced by such factors as the ingredients and proportions of ingredients in the herbicidal compositions, the manner of application, the desired effect, the nature of the weeds to be destroyed, and the like, as is well known to workers in this art. Specific recommendations thus cannot be given for each herbicidal compound of the invention under all possible conditions of application, but the following examples are indicative of typical effects that are capable of being achieved.

Example 6

Herbicidal emulsions were prepared from the active compounds Nos. 44, 46, 51, 53 and 57 in the manner of Example 4. Plots of peas, corn, and wheat infested with *Sinapis arvensis*, *Stellaria media*, and *Galinsoga parviflora* were sprayed with each of the emulsions at a rate to apply one kilogram of the active agent per hectare. The crops did not show recognizable damage. The weeds were completely destroyed in all instances.

Example 7

N-α-bromo-α-methylvaleryl-3-chloro-4-methylaniline (compound No. 57) was emulsified in water as described in Example 4. Two fields of tomatoes infested with *Sinapis arvensis*, *Stellaria media*, and *Galinsoga parviflora* were sprayed with the emulsion in amounts sufficient to deposit respectively 3 and 10 kg./ha. of the active ingredient. Even at the higher application rate, the tomatoes did not show recognizable damage. The weeds were totally destroyed in both fields.

Example 8

Test plots of corn and wheat infested with *Sinapis arvensis*, *Stellaria media*, and *Galinsoga parviflora* were sprayed with emulsions or dispersions of the active agents of the invention listed in Table 6 at the rate of 3 kg./ha. in 800 liters/ha. of liquid composition. The results achieved were evaluated on an arbitrary, but reproducible scale on which 0 represent the absence of recognizable damage, and 10 total destruction.

TABLE 6

| Compound No. | Corn | Wheat | Sinapis arvensis | Stellaria media | Galinsoga parviflora |
|---|---|---|---|---|---|
| 46 | 0 | 0 | 10 | 10 | 10 |
| 44 | 0 | 0 | 10 | 10 | 10 |
| 51 | 0 | 0 | 10 | 10 | 10 |
| 53 | 0 | 0 | 10 | 10 | 10 |
| 57 | 0 | 0 | 10 | 10 | 10 |
| 46 | 0 | 0 | 10 | 10 | 10 |
| 44 | 0 | 0 | 10 | 10 | 10 |
| 45 | 0 | 0 | 10 | 10 | 10 |
| 48 | 0 | 0 | 10 | 10 | 10 |
| 47 | 0 | 0 | 10 | 10 | 10 |
| 57 | 0 | 0 | 10 | 10 | 10 |
| 53 | 0 | 0 | 10 | 10 | 10 |
| 51 | 0 | 0 | 10 | 10 | 10 |
| 56 | 0 | 0 | 10 | 10 | 10 |
| 62 | 1 | 0 | 5 |  | 4 |
| 55 | 0 | 0 | 7 |  | 5 |
| 58 | 0 | 0 | 10 | 10 | 10 |
| 59 | 2 | 0 | 10 |  | 10 |
| 52 | 0 | 0 | 10 | 10 | 10 |
| 28 | 0 | 0 | 5 |  | 9 |
| 19 | 0 | 0 | 8 | 10 | 9 |
| 20 | 0 | 0 | 9 | 10 | 10 |
| 29 | 0 | 0 | 0 | 0 | 10 |
| 23 | 0 | 0 | 7 | 0 | 1 |
| 26 | 0 | 0 | 10 | 10 | 10 |
| 27 | 0 | 0 | 9 | 7 | 10 |
| 21 | 0 | 0 | 10 | 10 | 10 |
| 24 | 0 | 0 | 5 | 5 | 10 |
| 13 | 0 | 0 | 3 | 6 | 9 |
| 4 | 0 | 0 | 10 | 7 | 8 |
| 5 | 0 | 0 | 4 | 10 | 10 |
| 14 | 0 | 0 | 3 | 2 | 10 |
| 11 | 0 | 0 | 10 | 10 | 10 |
| 12 | 0 | 0 | 6 | 10 | 10 |
| 6 | 0 | 0 | 10 | 10 | 10 |
| 34 | 0 | 0 | 4 | 9 | 6 |
| 36 | 0 | 0 | 10 | 10 | 10 |
| 40 | 0 | 0 | 8 | 4 | 5 |
| 42 | 0 | 0 | 10 | 10 | 10 |
| 35 | 0 | 0 | 8 | 4 | 3 |
| 41 | 0 | 0 | 6 | 8 | 10 |

Example 9

Weed infested test plots of wheat and corn were sprayed with emulsions of the herbicidal compounds of the invention listed in Table 7 at the rate of 10 kg./ha. under conditions otherwise closely similar to those of Example 10. The higher rate of application increased the damage to the weeds and demonstrates the high selectivity against the crop plants.

TABLE 7

| Compound No. | Corn | Wheat | Sinapis arvensis | Stellaria media | Galinsoga parviflora |
|---|---|---|---|---|---|
| 46 | 0 | 0 | 10 | 10 | 10 |
| 44 | 0 | 0 | 10 | 10 | 10 |
| 45 | 0 | 0 | 10 | 10 | 10 |
| 48 | 0 | 0 | 10 | 10 | 10 |
| 47 | 0 | 0 | 10 | 10 | 10 |
| 51 | 0 | 0 | 10 | 10 | 10 |
| 53 | 0 | 0 | 10 | 10 | 10 |
| 57 | 0 | 0 | 10 | 10 | 10 |
| 58 |  | 0 | 10 | 10 | 10 |
| 59 |  | 0 | 10 | 10 | 10 |
| 52 | 0 | 0 | 10 | 10 | 10 |
| 4 | 0 | 0 | 10 | 10 | 10 |
| 5 | 0 | 0 | 4 | 10 | 10 |
| 11 | 0 | 0 | 10 | 10 | 10 |
| 12 | 0 | 0 | 6 | 10 | 10 |
| 6 | 0 | 0 | 10 | 10 | 10 |
| 19 | 0 | 0 | 10 | 10 | 10 |
| 20 | 0 | 0 | 10 | 10 | 10 |
| 26 | 0 | 0 | 10 | 10 | 10 |
| 27 | 0 | 0 | 10 | 10 | 10 |
| 21 | 0 | 0 | 10 | 10 | 10 |
| 34 | 0 | 0 | 9 | 10 | 10 |
| 36 | 0 | 0 | 10 | 10 | 10 |
| 40 | 0 | 0 | 9 | 10 | 10 |
| 42 | 0 | 0 | 10 | 10 | 10 |
| 35 | 0 | 0 | 10 | 10 | 9 |
| 41 | 0 | 0 | 10 | 10 | 10 |

Example 10

The minimum amounts of several herbicidal compounds of the invention necessary for destroying various plants were determined by means of a logarithmic sprayer. The compounds were employed in the form of their aqueous emulsions prepared as described in Example 4 and were applied to the plants listed in Table 8 after germination.

The initial concentration of the emulsion corresponded to an application rate of 5 kg. of active agent per hectare, the ultimate concentration to 0.2 kg./ha. As is apparent from the table, corn and carrots tolerated the full initial concentration of the several selective herbicidal agents of the invention. The weeds present were destroyed by much smaller amounts.

TABLE 8.—APPLICATION RATE NECESSARY FOR COMPLETE DESTRUCTION, KG./HA.

| Compound No. | Corn | Carrots | Peas | Sinapis arvensis | Chenopodium album | Polygonum lapathifolium | Galinsoga parviflora |
|---|---|---|---|---|---|---|---|
| 50 | >5 | >5 | >5 | 0.8 | 0.8 | 1.3 | 1.4 |
| 51 | >5 | >5 | >5 | 0.5 | 0.7 | 1.3 | 0.6 |
| 53 | >5 | >5 | 2.0 | 0.2 | 0.5 | 0.3 | 0.5 |

> means greater than.

Example 6

Wheat, corn, carrots, and peas were treated in open fields with an aqueous emulsion of N-α-chloro-α-methylvaleryl-3,4-dichloraniline after germination by means of a logarithmic sprayer. The initial concentration of the herbicidal agent corresponded to an application rate of 5 kg./ha., the ultimate concentration 0.2 kg./ha. None of the crops were significantly damaged by the full concentration of the herbicidal agent, but the weeds present were totally destroyed at the following application rates:

|  | Kg./ha. |
|---|---|
| Senecio vulgaris | 0.6 |
| Chenopodium album | 0.2 |
| Lamium amplexicaule | 0.2 |
| Thlaspi arvensis | 0.2 |
| Papaver sp. | 0.2 |
| Urtica urens | 0.2 |

While the invention has been described with reference to specific embodiments thereof, it will be understood that it is not limited to the specific examples chosen for the purpose of the disclosure, but is to be construed broadly as defined in the appended claims.

What is claimed is:
1. A method of selectively destroying weeds in a plant crop which comprises applying to said crop and to said weeds a herbicidal agent at a rate sufficient to destroy said weeds substantially without damaging said crop, said agent being a compound of the formula

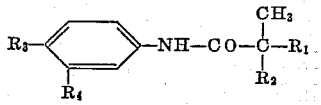

wherein $R_1$ is lower alkyl, $R_2$ is halogen, and each of $R_3$ and $R_4$ is a member of the group consisting of hydrogen, halogen, lower alkyl, lower alkoxy, trifluoromethyl, and the nitro radical.

2. A method as set forth in claim 1, wherein said compound is N-α-chloro-α-methylvaleryl-3-4-dichloraniline.

3. A method as set forth in claim 1, wherein said compound is N-α-chloro-α-methylvaleryl-3-chloro-4-methyl-aniline.

4. A method as set forth in claim 1, wherein said compound is N-α-bromo-α-methylvaleryl-3,4-dichloroaniline.

References Cited

UNITED STATES PATENTS

| | | | |
|---|---|---|---|
| 1,279,942 | 9/1918 | Thorp | 260—562 |
| 2,499,352 | 3/1950 | Bruce et al. | 260—562 X |
| 2,912,460 | 11/1959 | Ehrhart et al. | 260—562 |
| 3,007,786 | 11/1961 | Hamm et al. | 71—2.3 |
| 3,042,720 | 7/1962 | Paabo | 260—562 |
| 3,111,403 | 11/1963 | Soper | 71—2.3 |

FOREIGN PATENTS

| | | |
|---|---|---|
| 840,912 | 7/1960 | Great Britain. |
| 869,169 | 5/1961 | Great Britain. |
| 962,014 | 6/1964 | Great Britain. |
| 971,819 | 10/1964 | Great Britain. |

OTHER REFERENCES

Huffman et al., J. Agr. & Food Chem., vol. 8, No. 4, 1960, pages 298 to 302 (pp. 299, 300 and 301 particularly relied upon).

LEWIS GOTTS, *Primary Examiner.*

JAMES O. THOMAS, Jr., *Examiner.*